No. 821,762. PATENTED MAY 29, 1906.
M. O. STEERE & S. W. WARDWELL.
HARNESS MOTION FOR LOOMS.
APPLICATION FILED APR. 9, 1902.

6 SHEETS—SHEET 1.

WITNESSES
INVENTORS
ATTORNEYS

No. 821,762. PATENTED MAY 29, 1906.
M. O. STEERE & S. W. WARDWELL.
HARNESS MOTION FOR LOOMS.
APPLICATION FILED APR. 9, 1902.

6 SHEETS—SHEET 2.

WITNESSES

INVENTORS
Merrill O. Steere
Simon W. Wardwell
BY
ATTORNEYS

No. 821,762. PATENTED MAY 29, 1906.
M. O. STEERE & S. W. WARDWELL.
HARNESS MOTION FOR LOOMS.
APPLICATION FILED APR. 9, 1902.

6 SHEETS—SHEET 4.

WITNESSES

INVENTORS
Merrill O. Steere
Simon W. Wardwell
BY
ATTORNEYS

No. 821,762. PATENTED MAY 29, 1906.
M. O. STEERE & S. W. WARDWELL.
HARNESS MOTION FOR LOOMS.
APPLICATION FILED APR. 9, 1902.

6 SHEETS—SHEET 5.

WITNESSES.

INVENTORS
Merrill O. Steere
Simon W. Wardwell
BY
ATTORNEYS

UNITED STATES PATENT OFFICE.

MERRILL O. STEERE, OF PAWTUCKET, AND SIMON W. WARDWELL, OF PROVIDENCE, RHODE ISLAND, ASSIGNORS TO BRINDLE-STEERE COMPANY, OF PORTLAND, MAINE, A CORPORATION OF MAINE.

HARNESS-MOTION FOR LOOMS.

No. 821,762.  Specification of Letters Patent.  Patented May 29, 1906.

Application filed April 9, 1902. Serial No. 102,124.

*To all whom it may concern:*

Be it known that we, MERRILL O. STEERE, residing at Pawtucket, and SIMON W. WARDWELL, residing at Providence, in the county of Providence and State of Rhode Island, citizens of the United States, have invented a new and useful Improvement in Harness-Motions for Looms, of which the following is a specification.

The object of the invention is to produce a harness-motion for looms that shall be of simple structure, more direct in its action, more accessible for adjustment, cleaning, and repairs, and less massive and cumbersome than the devices now employed for a like purpose.

The preferred embodiment of our invention is fully disclosed in the accompanying specification and the annexed drawings, of which—

Figure 1:
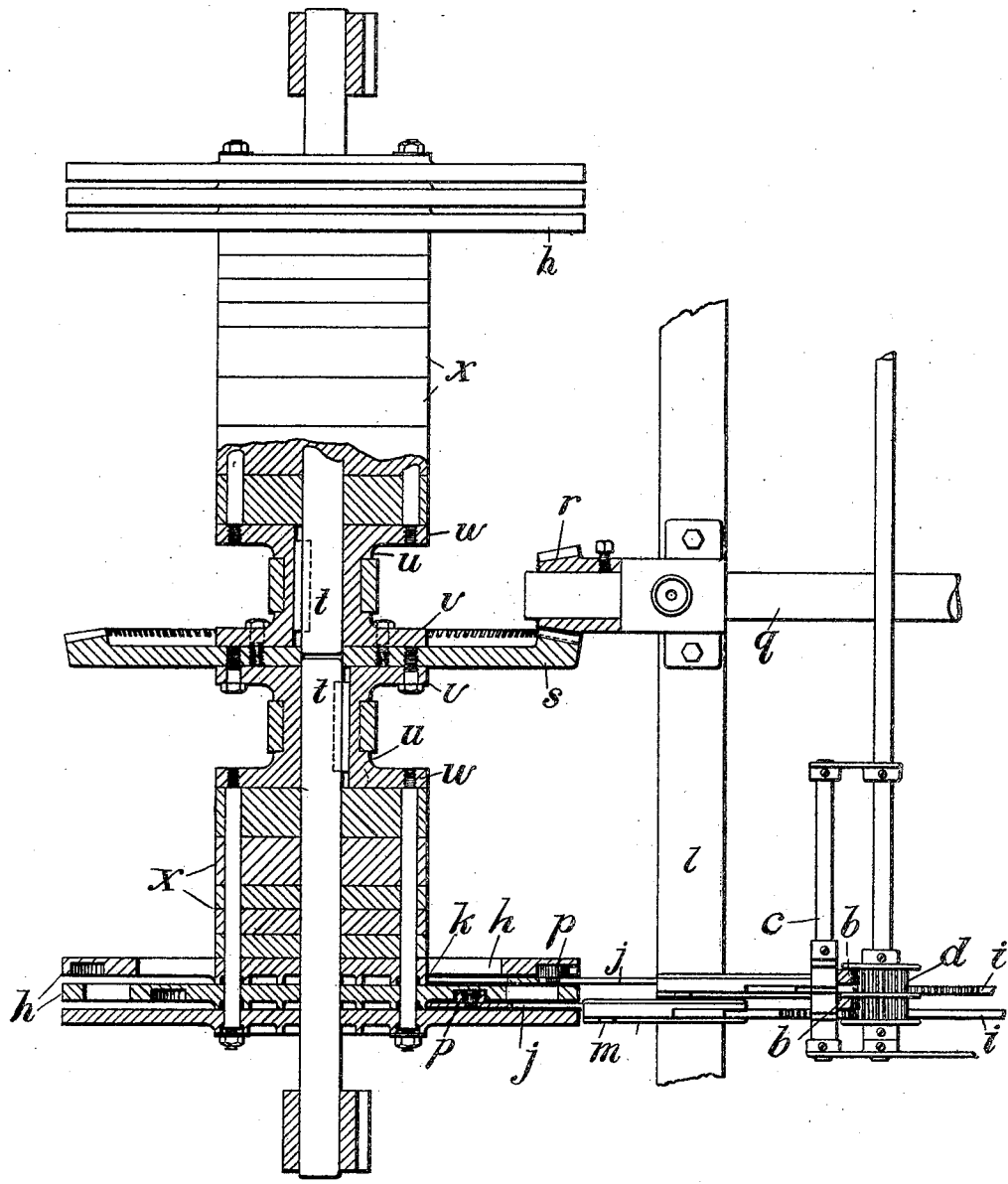
Figure 3:
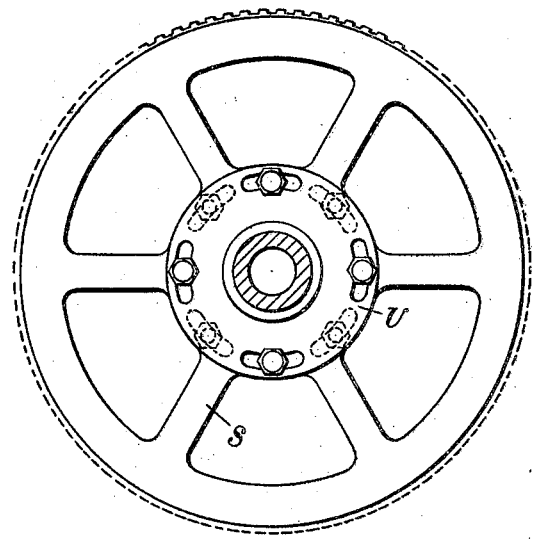
Figure 2:
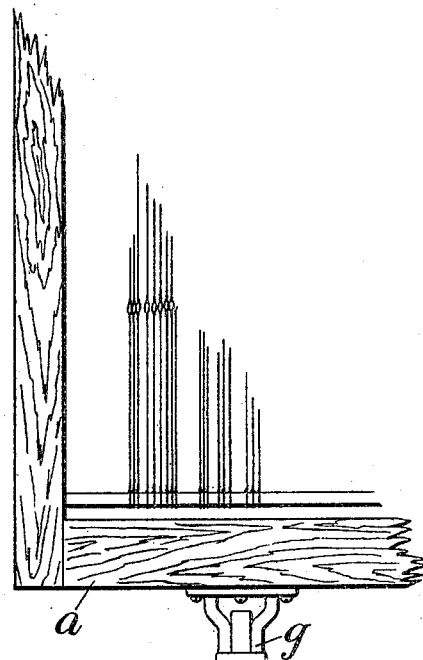
Figure 2:
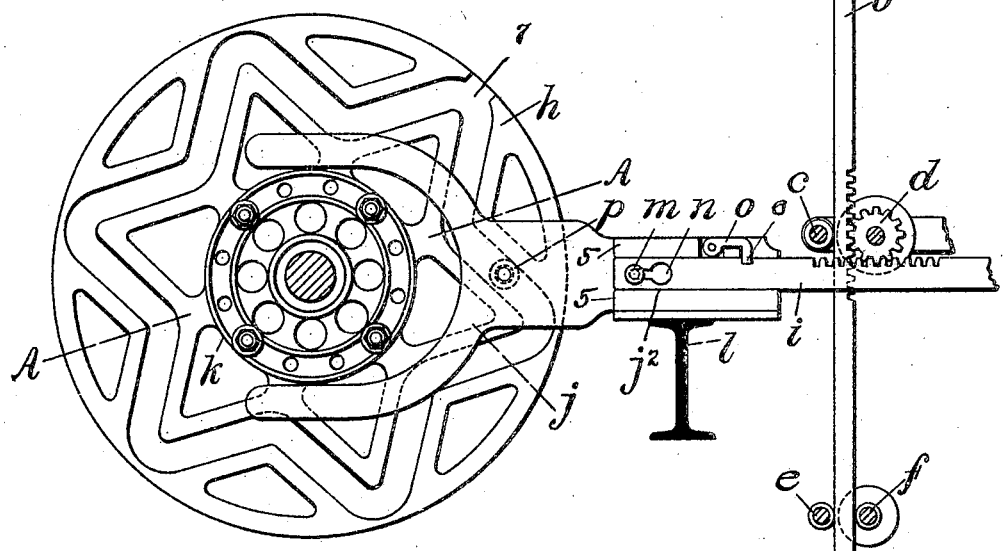

Figure 1 is a plan view of the harness-motion in part section on the line A A, Fig. 2. Fig. 2 is a front view of the same. Fig. 3 is a side view of the cam-driving gear $s$. Figs. 4, 5, 6, 7, 8, and 9 show modifications of the structure.

Our invention consists, broadly and essentially, in the following: in operating the heddle-frames of a loom from a longitudinally-reciprocated member that is driven directly from the harness-cam or equivalent device through appropriate connections intermediate said longitudinally-reciprocated member and the rods or other devices on which the heddle-frame is mounted; in providing adequate devices whereby the timing of two conjunctively-driven sets of harness may be independently adjusted or whereby either set may be disconnected from the driving devices of the loom for repair or adjustment, leaving the other set in operation.

We hereinafter describe the preferred embodiment of our invention, but indicate in the drawings that other devices than those disclosed may be employed to operatively connect the cam-rod and the heddle-frame rods.

As some features of our improved device are peculiarly applicable to a loom having a separate set of harness on each side and each operating independently of the other, we have shown it as adapted for use on a loom such as described in Patent numbered 634,681, dated October 10, 1899.

The heddle-frame $a$ is mounted on rods or rack-bars $b$, (only two of which are shown in the drawings,) which move vertically with a direct straight-line movement, controlled by a guide $c$, in conjunction with a pinion or gear $d$, and by suitable other guides $e$ and $f$. The guides $c$, $e$, and $f$ are preferably rods mounted in brackets, but may, if desirable, carry rolls to relieve the wear and friction that is liable to occur where the rack-bar rubs directly on its guide.

The rack-bars $b$ are secured to the heddle-frame by brackets $g$ of peculiar form. Each bracket comprises a foot by which it is attached to the heddle-frame, a socket in which the rack-bar is secured by a set-screw, and arms by which the socket is joined to the foot and which extend from the socket for a distance parallel and just far enough apart to receive the rack-bar, thereby steadying it to resist any strain or loosening due to a longitudinal jar or movement of the heddle-frame.

The gear $d$ gears or meshes with the teeth of the rack-bar $b$, which through the gear is caused to reciprocate, the gear being rotated in alternately opposite directions by any suitable means, as by the cam $h$. The latter is connected with the gear $d$ by means of a second rack-bar $i$, which also meshes with the gear $d$. For convenience we shall designate the rack-bars $b$ as the "heddle-frame rods" and the rack-bar $i$ the "cam-rod." The cam-rod by its reciprocating movement causes the gear $d$ to rotate in alternately opposite directions, thus reciprocating the heddle-frames $a$ to shift the warp-threads in the loom.

Figure 8:
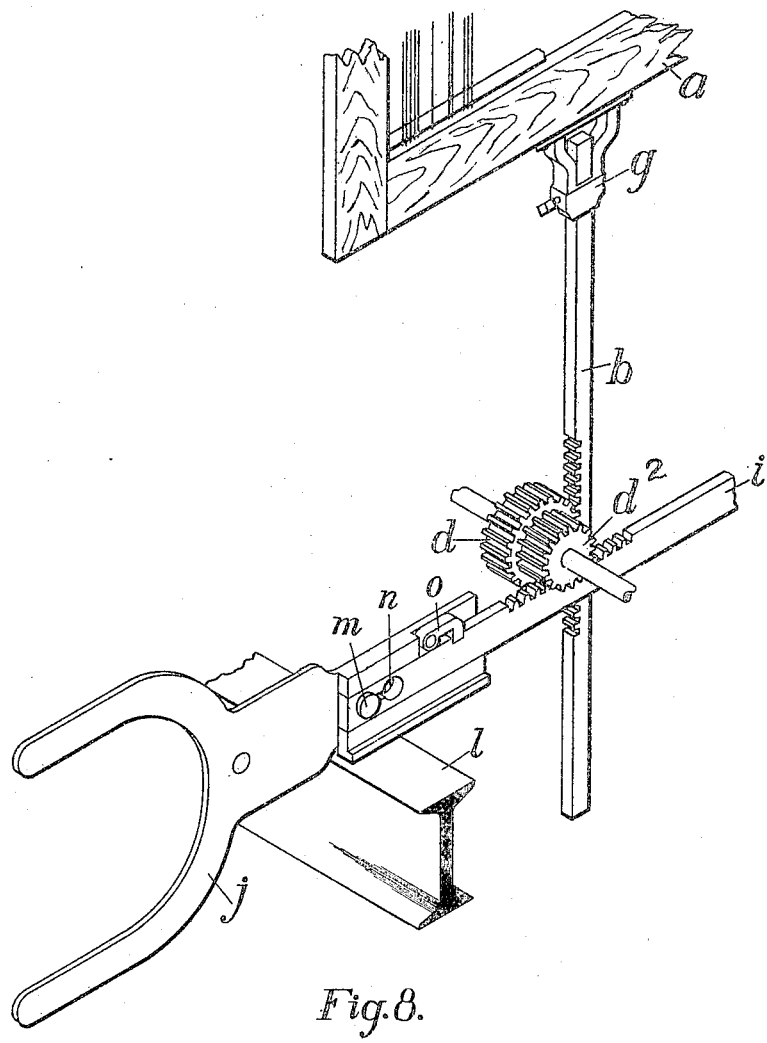
Figure 9:
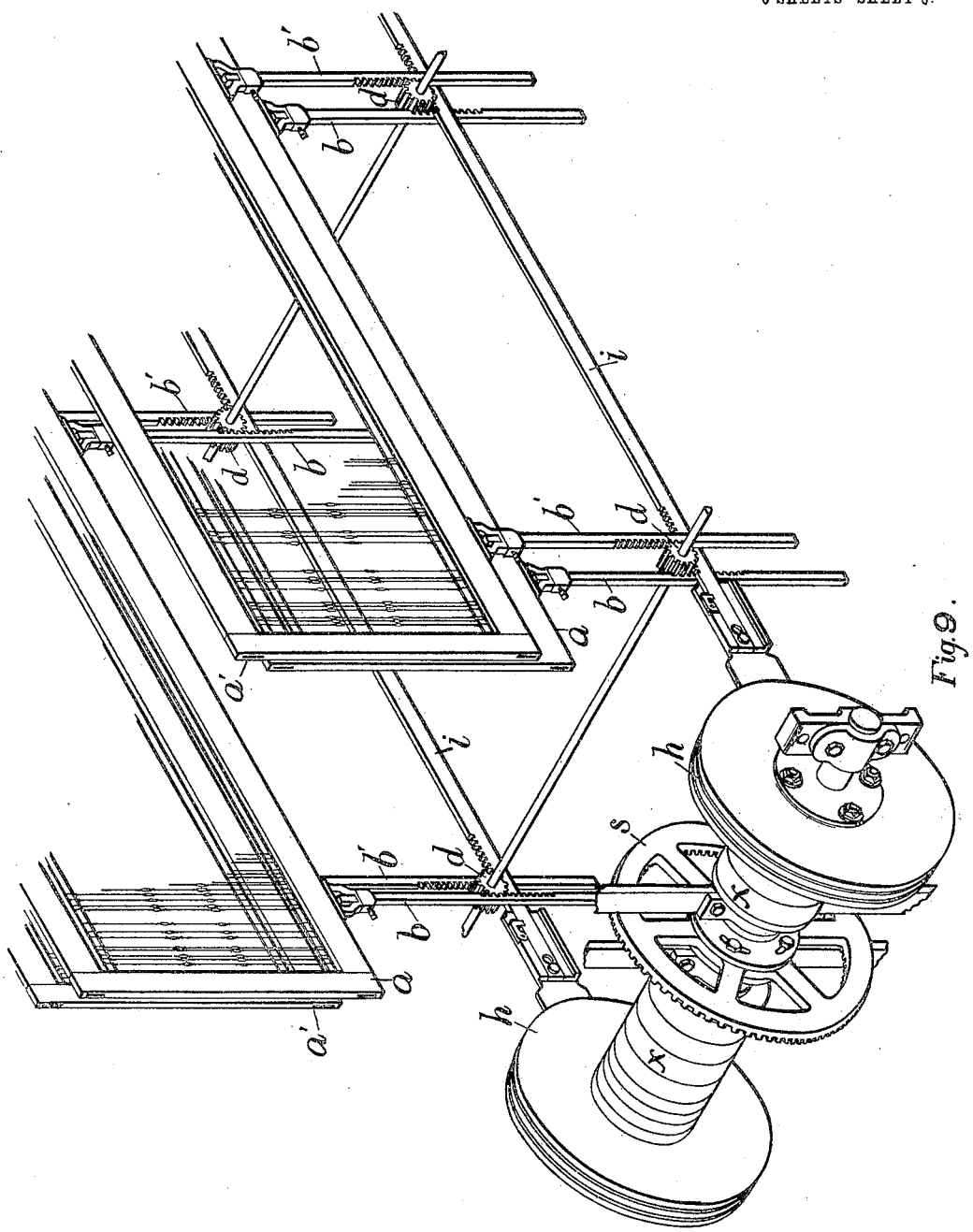

When a plurality of heddle-frames are employed, it is sometimes essential that those which are located farthest from the shuttles have a greater degree of reciprocation than those which are closest in order that the shed or opening between all of the warp-threads shall have the same amplitude. This is accomplished by employing pairs of gears $d'$ $d^2$ of different diameters, as shown in Fig. 8, so mounted that the cam-rods engage one gear $d'$ of each pair and the heddle-frame rods the other, $d^2$. Thus if the cam-rod engages a sixteen-tooth gear $d'$ and the associated gear $d^2$, with which the heddle-frame rod engages, has sixteen teeth the heddle-frame rod will move the same distance as the cam-rod, whereas if the gear $d^2$, Fig. 8, with which the heddle-frame rod engages, has twenty teeth it will have twenty-five per cent. more movement than the cam-rod.

Figure 4:
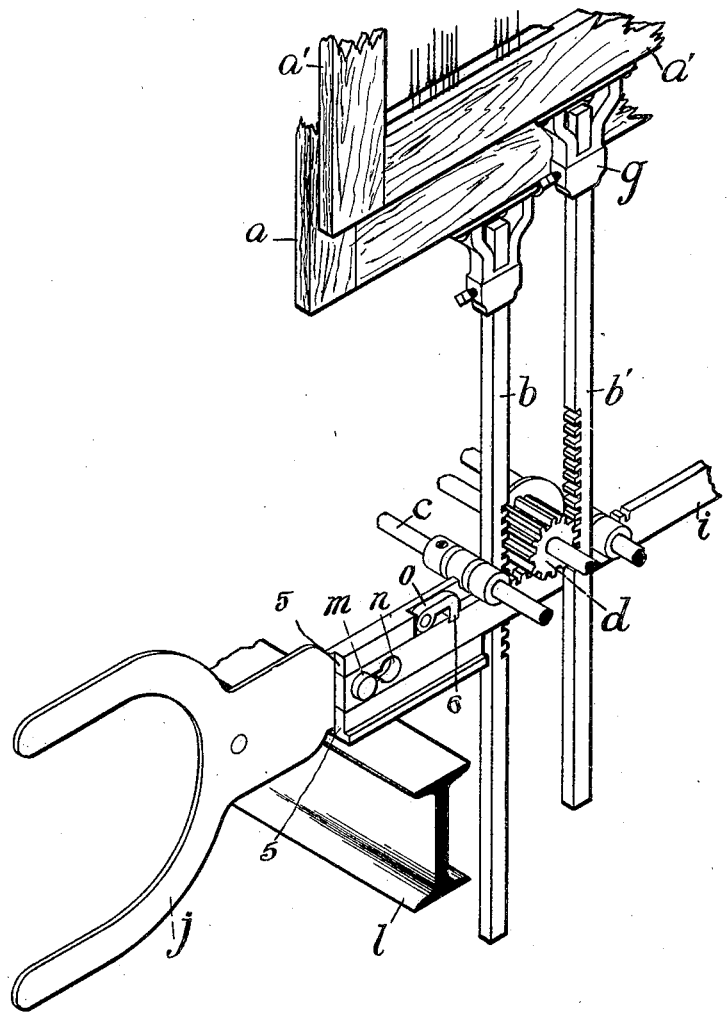
Figure 5:
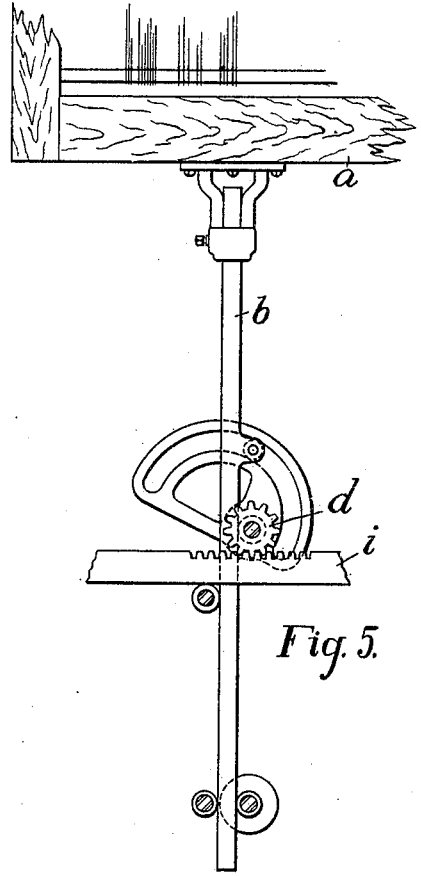
Figure 6:
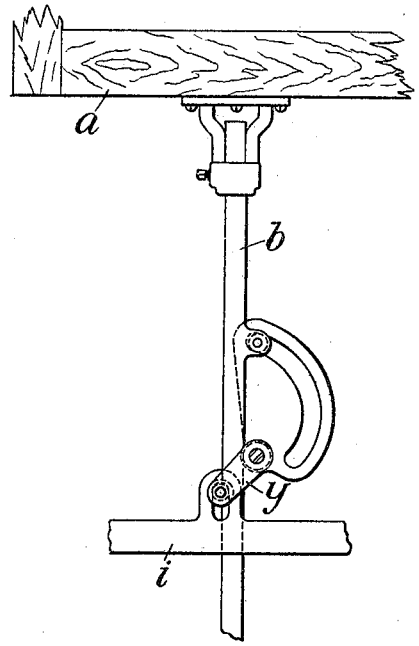

In weaving certain fabrics both heddle-frames of each pair have the same motions, but one in a reverse direction to the other. For instance, in weaving plain fabrics the heddle-frames have a simple motion of reciprocation, one rising while the other descends. When such fabrics are woven, the harness mechanism may be still further simplified and lightened by mounting the frames as shown in Fig. 4, with both heddle-frames driven from one gear, the heddle-frame rods $b$ and $b'$ being arranged on opposite sides of said gear. It is obvious that the rotation of the gear will cause the heddle-frame $a$ to rise while the heddle-frame $a'$ descends. By this means we are enabled to dispense with one cam and one cam-rod, thereby not only simplifying the structure, but also the adjustment of the parts, while one frame balances the other.

The cam-rod $i$ is secured at one end to a yoke $j$, that straddles the cam-hub $k$, whereby it is supported and guided in a straight line. The I-beam $l$, on which the neck of the yoke rests, also serves, in conjunction with the cam-hub, to support and guide the yoke.

The cam-rod is secured to the yoke by the following novel means: The neck of the yoke is formed with a groove between two ribs 5 5 to receive the end of the cam-rod and with a headed stud or button $m$, set in the groove. The end of the cam-rod is formed with an eye or buttonhole $n$, having a narrow portion that fits the shank of the button and at the end of the narrow portion an enlarged opening of sufficient size to pass over the head of the button. On the side of the yoke-neck is mounted a latch $o$, which engages an appropriate notch 6 in the edge of the cam-rod when the latter has been engaged with the button $m$, as shown in Fig. 2.

Secured to the yoke $j$ is a roll $p$, which engages with a groove 7 of appropraite form in the face of the cam $h$. As indicated in Fig. 1, two sets of cams are employed, both driven from a common main driving-shaft $q$ through bevel-gears $r$ and $s$.

In case of repair or adjustment it is frequently desirable to disconnect one set of cams, while the other is maintained in operation to avoid stopping the whole loom and the consequent loss of production. To allow this, a new and improved cam connection and gear-mounting has been devised. The cam-shaft $t$ is made in two abutting sections. Adjacent the abutting end of each section is keyed or otherwise secured the double-flanged sleeve $u$, to one flange $v$ of which is secured the bevel-gear $s$. The body of the gear is bored to fit the shaft-sections, the ends of which extend into the gear-body, and concentric with the shaft is a ring of tapped holes. In each of the flanges $v v$ are circular slots, preferably so spaced as to match alternating tapped holes in the gear-body. By bolts the flanges $v v$ are connected with the gear or member $s$, the bolts being of such length as not to extend from one flange through the gear into the other flange. By withdrawing either set of bolts either shaft-section can be disconnected from the gear, which is left secured to the other section. By means of the circular slots in each flange either set of cams can be rotatively adjusted with reference to and without disturbing the other. This is an exceedingly valuable feature, for it sometimes occurs that one side of the loom will be correctly adjusted while the opposite end will not be. Were the two sets of cams rigidly joined, the only remedy would be to throw the correctly-adjusted side of the loom out of adjustment and average the total error between the two sides of the loom. The cams are secured to their shafts in a customary manner. Long bolts are secured to the flanges $w w$ of the sleeves $u$, on which the cams are strung and secured in place. Enough cams to fill the length of the bolts are seldom used, and their place is filled with washers $x x$.

Heretofore the loom-harness has usually been operated by the cams through cumbersome jacks hung at the end of the loom and by additional mechanism possessing much weight and many joints and bearings and which because of its inertia and frictional resistance is not susceptible of rapid movement. Further, flexible straps were usually employed in the said connections and caused a disarrangement of the heddle-frames. By means of our invention a direct connection is obtained between the cam and the heddle-frame with a minimum amount of mechanism, and the movement of the parts is made positive and is unaffected by the change in length of flexible connections or by the uncertain securing of the heddle-frames to such connections.

Figure 7:
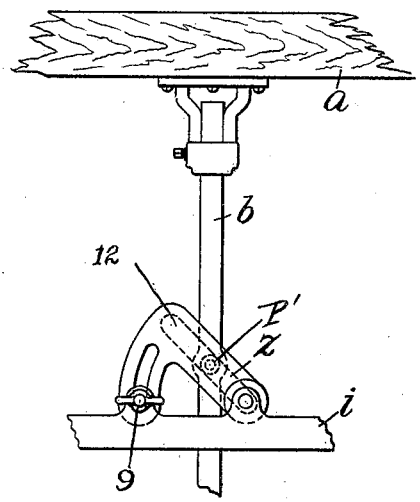

We have shown and described a preferred embodiment of our invention; but it is obvious that the same results may be substantially obtained by non-essential modifications and, further, that certain structural modifications must of necessity be made in adapting our devices to looms of different structure, which modifications would lie within the scope of our invention, even though comprising a greater or less number or different arrangement of the members. Among these would be the substitution of any adequate form of gears or connections for those shown between the longitudinally-reciprocated member $i$, reciprocated in a straight line from the cam, and the vertically-reciprocated member b of the structure. Thus in Fig. 5 we show a cam connected with the pinion d for actuating the heddle-frame and in Fig. 6 a cam operated from the reciprocating rod i by a crank-arm y. Fig. 7 shows a means for varying the movement of the heddle-frame rods b by adjusting the rise of a cam 12, which has on the back face a groove z, (dotted lines,) engaging the roll P', and is pivoted directly on the rod i and secured after adjustment by a suitable set-screw 9. Many other devices might be shown for producing the same relative motion of the longitudinally-reciprocating member i and the reciprocating member b.

Therefore, without limiting ourselves to the precise form or arrangement of structure hereinbefore described, we claim—

1. The combination in a harness-motion, of a heddle-frame, positively-reciprocated heddle-frame rods having racks, a cam, a cam-rod having a rack and a yoke supported on and guided by the hub of the cam, and gears connecting the cam-rod with the heddle-frame rods, whereby the latter are reciprocated to operate the heddle-frames.

2. In a harness-motion for looms, the combination of a cam h, a cam-rod i and a connecting member j between the cam and the cam-rod, whose forked extremity is supported on the cam-hub k, and in whose opposite extremity is formed a channel to receive the rod i, a button or headed stud mounted on the member j to engage the rod i, and a catch also mounted on the member j, to engage the rod to hold it in engagement with the button aforesaid.

3. In a harness-motion, the combination of a cam h, a cam-rod i having a "buttonhole" n and a side notch, of a member j whose forked end is supported on the cam-hub k, and in whose opposite end is formed a channel to receive the rod i, a button m, mounted in the channel to engage the "buttonhole" n in the rod i, and a swinging latch mounted on the side of the member j to engage the notch in the edge of the rod i after the latter has been secured on the button m, substantially as described.

4. In a harness-motion for looms, the combination of a cam h, a yoke member j supported by one end on the hub of the cam and at its other end by the bearing l, a roll p mounted on the member j and engaging the groove of the cam h, a rod i, having rack-teeth and secured to the member j, a gear d, meshing with the teeth of the rack, vertically-moving rods b also provided with rack-teeth that mesh with the gear d, guides to direct the movement of the rods b, and a heddle-frame mounted on the said rods b, substantially as described.

5. The combination in a loom of two parallel sets of harness, a driving-shaft, and means carried thereby for operating each set of harness from the shaft, and devices carried by the shaft for connecting said means operatively with and disconnecting the same from the shaft, substantially as described.

6. The combination in a loom with two sets of harness, two sets of cams, one to operate each harness, and a single main driving-shaft for both sets of cams, of means for rotatively adjusting one set of cams with relation to the other to vary the relative times of action of the two sets of harness.

7. The combination in a loom of two sets of harness, a cam driving each set of harness, a driving-shaft and gears between the latter and said cams, and independent devices connecting one of said gears detachably with each cam, substantially as described.

8. The combination in a loom-harness motion, with one main driving-shaft for the loom, of two sets of harness, two sets of cams for said harness, a shaft having two sections in alinement and on which said cams are mounted and connections between the sectional shaft and the driving-shaft whereby both sections can be driven as one shaft or either section independently.

9. The combination in a loom-harness motion with two sets of harness, two sets of cams to actuate them, and devices for actuating the cams, of two shaft-sections in line with each other on which the cams are mounted, and connections between the shaft-sections whereby either set of cams may be disconnected from the actuating devices, and whereby the relative rotative position of the shaft-sections may be adjusted to adjust the relative action of the two sets of cams.

10. The combination in a loom-harness motion, of two independent sets of harness, two sets of cams to drive them, two abutting shaft-sections to support the cams, a flanged member mounted on each shaft-section, and a wheel whereby the shaft-sections are driven, mounted on the abutting ends of each shaft-section, and to which both flange members are independently secured.

In testimony whereof we have signed our names to this specification in the presence of two subscribing witnesses.

MERRILL O. STEERE.
SIMON W. WARDWELL.

Witnesses:
ARTHUR A. ANNINGTON,
EZRA D. GROVES.